United States Patent [19]
Bradbury

[11] Patent Number: 5,517,013
[45] Date of Patent: May 14, 1996

[54] DEVICE FOR HOLDING CHIP CARDS

[75] Inventor: G. Roland Bradbury, Geisenheim, Germany

[73] Assignee: Copyguard Electronic GmbH, Geisenheim, Germany

[21] Appl. No.: 124,217

[22] Filed: Sep. 21, 1993

[30] Foreign Application Priority Data

Oct. 22, 1992 [DE] Germany ............................ 42 35 695.4

[51] Int. Cl.[6] .................................................. G06K 13/063
[52] U.S. Cl. ............................................ 235/485; 235/486
[58] Field of Search ........................................ 235/486, 485

[56] References Cited

U.S. PATENT DOCUMENTS

| | | | |
|---|---|---|---|
| 4,527,052 | 7/1985 | Kilborn | 235/486 |
| 4,724,310 | 2/1988 | Shimamura | 235/486 |
| 4,734,567 | 3/1988 | Hansbauer | 235/486 |
| 4,743,746 | 5/1988 | Murschall | 235/486 |
| 4,843,221 | 6/1989 | Ohtsuki | 235/486 |
| 4,931,622 | 6/1990 | Ohtsuki | 235/486 |
| 5,043,562 | 8/1991 | Hautvast et al. | 235/486 |

*Primary Examiner*—Harold Pitts
*Attorney, Agent, or Firm*—Jones, Tullar & Cooper

[57] ABSTRACT

In the case of a device for holding chip cards in a position associated with a scanning device and comprising a retaining device arranged adjacent to an intake gap, simple and low-price means are employed to ensure that there is definitely no possibility of a chip card, once inserted, being prematurely and improperly withdrawn, because the retaining device comprises an intake mouth with at least two jaws delimiting it, of which at least one jaw is able to be moved towards the other jaw and is able to be moved away from it and at least one jaw has a retaining claw adapted to lock onto the other jaw when the intake mouth is closed.

6 Claims, 2 Drawing Sheets

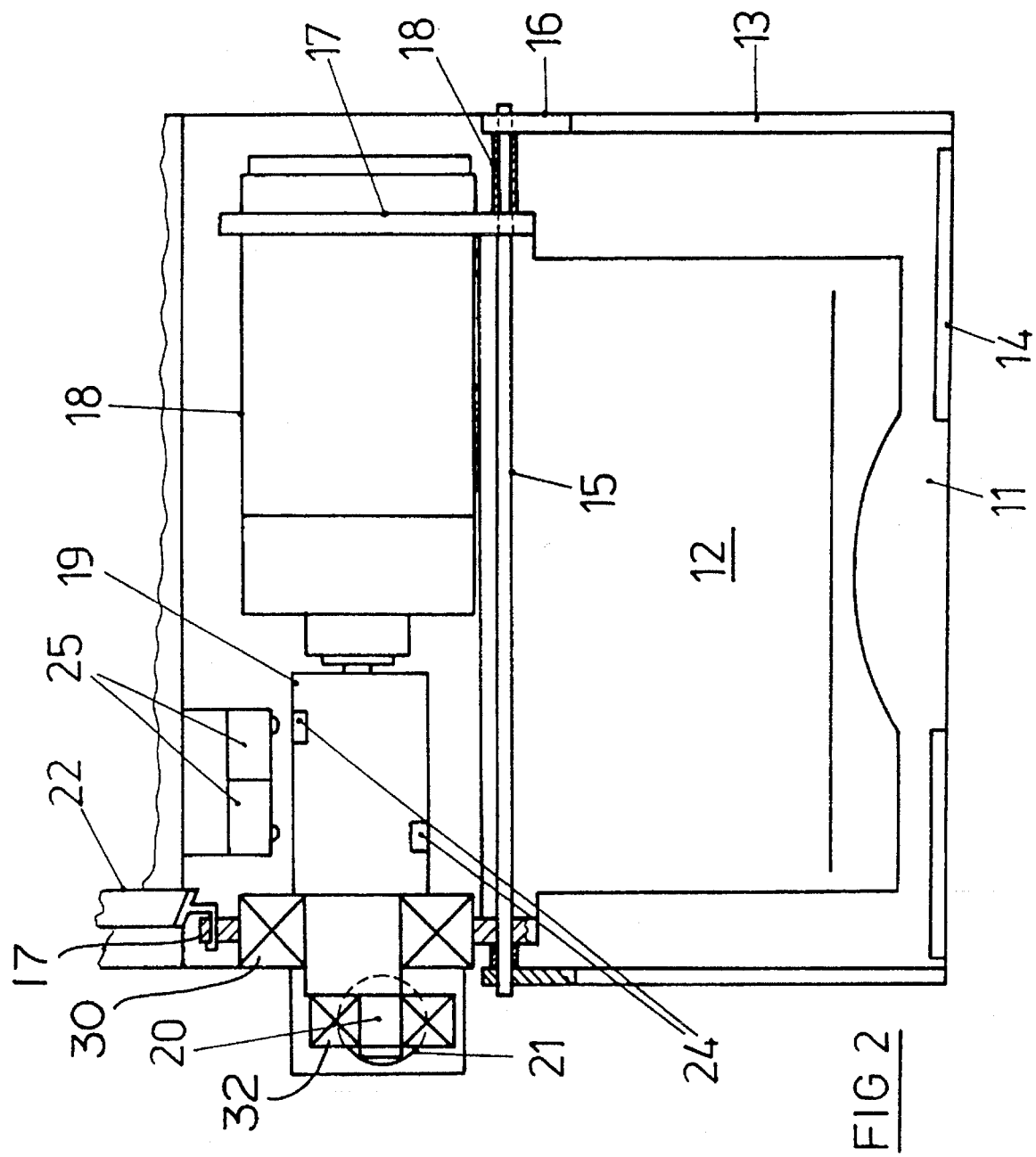

DEVICE FOR HOLDING CHIP CARDS

BACKGROUND OF THE INVENTION

The present invention relates to a device for holding chip cards in a position associated with a scanning device and comprising a retaining device arranged adjacent to an intake gap.

In the case of known chip card communication equipment the retaining device for the chip cards, which are not moved during the scanning operation, is designed in the form of a friction brake. Consequently it is possible to pull back the chip card, once inserted, against the braking action of a friction brake, something which however may lead to damage to the chip card. Known equipment is hence not sufficiently safe and reliable. In this connection it is in fact to be assumed that users of chip cards for some reason or other frequently attempt to withdraw the chip card they have inserted improperly prior to the right time for withdrawal, the result then being that both the chip card and also the scanning unit may be damaged.

SUMMARY OF THE INVENTION

Taking this state of the art as a starting point one object of the present invention is consequently to provide a device of the type initially mentioned which is improved using simple and low-price means that there is definitely no possibility of a chip card, once inserted, being improperly withdrawn.

in order to achieve this and/or other objects appearing from the present specification, claims and drawings, in the present invention the retaining device is provided with an intake mouth with at least two jaws delimiting it, of which at least one jaw is able to be moved towards the other jaw and is able to be moved away from it, and at least one jaw has a retaining claw adapted to lock or hook onto the other jaw when the intake mouth is closed.

These measures lead to the advantage of having an interlocking holding action on a chip card during the communication operation. Any improper withdrawal against a retaining device which only acts by friction is therefore out of the question. Accordingly there is the advantage of avoiding damage or wear of the cards and furthermore of the scanner, and of ensuring an exact and complete transmission of information; something which, for example, renders possible accurate keeping of accounts and the like.

Thus, for example, the lower jaw may be arranged stationarily and be provided with lateral ribs flanking the upper jaw in the near position thereof and at least one rear edge rib constituting a locking claw. These measures lead to a reliable locking device surrounding the rear gripped part of an inserted card on all sides thereof. The lateral edge ribs function simultaneously as a card guide during introduction of the card.

In accordance with a further convenient measure, the moving jaw is designed in the form of a pivotally arranged flap. This renders possible a simple construction of the setting device required for pivoting.

Another advantageous feature of the present invention is such that the pivoting jaw is pivotally journaled on a shaft which is parallel to the other jaw and is provided with at least one lug extending past the shaft, on which lug a setting device acts, by means of which the pivotal jaw is able to be pivoted in the desired fashion. These measures lead practically to a two-armed flap design which for its part is responsible for a simple and sturdy mechanical design and an ergonomic operation.

In keeping with yet another possible and more especially advantageous form of the present invention, on one lug of the pivotal jaw a shaft is mounted which is parallel to the pivot axis of the bearing, which shaft on the one hand may be driven by a motor and on the other hand bears an eccentric pin which under the action of a drive spring is able to be held against a stationary abutment. These measures ensure that the direction of rotation of the motor does not have to be reversed and in fact it may turn in a single direction only, and only has to be switched on and off, something which considerably simplifies the design of the device as well.

Further advantageous developments and convenient forms of the present invention will be understood from the claims and the following detailed descriptive disclosure of one embodiment thereof in conjunction with the accompanying drawings.

BRIEF DESCRIPTION OF THE DRAWINGS

FIG. 2 is a plan view of the arrangement in accordance with FIG. 1 partly in section.

DETAILED DESCRIPTION OF A PREFERRED EMBODIMENT OF THE INVENTION

Figure 1:
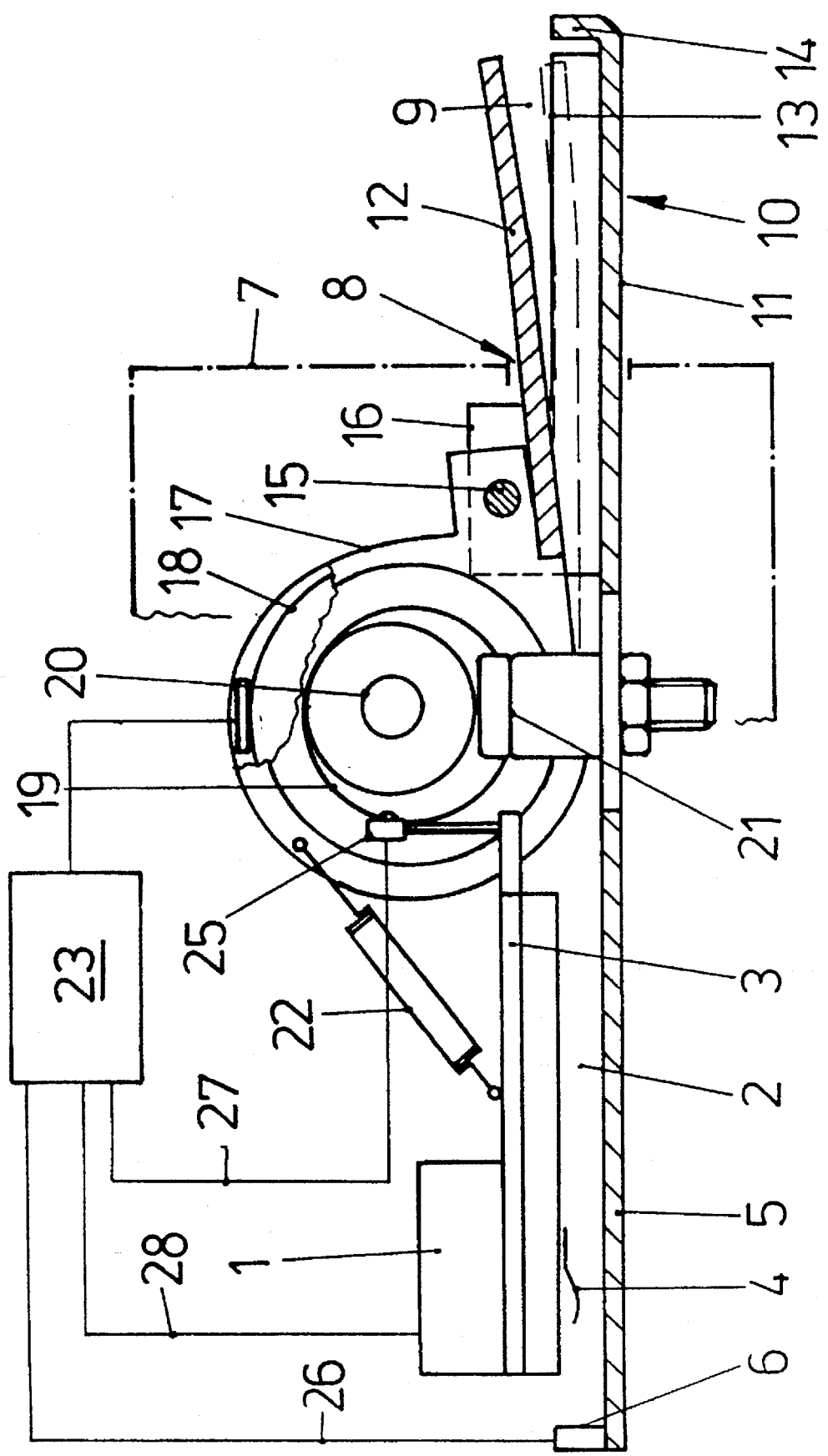
FIG. 1 is a side elevation of a device, partly in section, in accordance with the present invention.

The device illustrated in the drawing for the scanning of so-called chip cards, which are scanned while stationary, comprises a read head 1 which is mounted on a plate 3 extending over a receiving space 2 for the leading end of a chip card. The plate 3 is furnished with holders 4 constituted by resilient clips, and by means of which an inserted chip card may be held in engagement with the floor 5 of the receiving space 2. The end which is to the fore in the direction of insertion of the receiving space 2 is delimited by an abutment projecting from the floor, and is in the present case constituted by a sensor 6 responsive to the leading edge of the chip card.

The scanning device is received in a housing 7, which in the drawing is merely indicated in chained lines. The housing 7 is provided with a slot 8 arranged at the same level as the receiving space 2, and into the slot 8 an intake mouth 10 is set which has an intake gap 9 associated with the receiving space 2. The mouth 10 is defined by two plate-like jaws 11 and 12 extending to the rear out of the slot 8 and enclosing the intake gap 9 between them.

The rear jaw 11 is designed in the form of a stationary plate adjoining the floor 5 and provided with edge ribs 13 and 14 on its lateral edges and its rear edge so that there is a trough delimited to the side and rear by the edge ribs 13 and 14 into which the rear end of an inserted chip card may be lowered. The upper jaw 12 is designed in the form of a tongue-shaped flap, which is mounted pivotally for rocking about an axis parallel to the support surface of the lower jaw 11. In order to define the pivot axis there is provided a rod 15, which extends across the width of the device, and whose lateral ends are received on bearing supports 16 constituted by loop-like lugs on the lower jaw 11, and on which the upper jaw 12 is pivotally supported with bearing supports constituted by loop-like lugs 17. In the lateral direction, the flap forming the upper jaw 12 is supported by spacer bushings 18 arranged between the lugs 17 and the bearing supports 16 so that the flap may not slide.

The flap forming the upper jaw 12 is able to be swung towards and away from the lower jaw 11 by means of an associated positioning device. In the position in which the upper jaw 12 is swung out of the way, indicated in full lines in FIG. 1, the intake gap 9 is opened so that a chip card may be inserted. The lateral edge ribs 13 of the stationary jaw 11 may function as lateral guide elements. The chip card is inserted so far that the leading end thereof runs onto the sensor 6, which is located at the front in the direction of insertion, of the receiving space 2. The distance of the rear edge ribs 14 from the front sensor 6 is approximately equal to the length of the associated chip card with the addition of some play for movement so that the rear end of the completely inserted chip card extends into the trough defined by the edge ribs 13 and 14. In order to secure the chip card in this position the flap constituting the upper jaw 12 is pivoted towards the lower jaw 11 shown in broken lines in FIG. 1. In this near position the flap forming the upper jaw 12 extends into the trough defined by the edge ribs 13 and 14 in such a manner that the inserted chip card is reliably held and prevented from dropping out. The rear edge ribs 14 of the stationary jaw 11 in this case function as rear locking claws or retaining claws which prevent withdrawal of the inserted chip card by a positive locking action. The lateral edge ribs 13 prevent access to the rear end of an inserted chip card from the side.

The above mentioned positioning device for pivoting the flap constituting the upper jaw 12 consists, as best shown in FIG. 2, of a motor 18 mounted on a loop-like lug 17 of the upper jaw 12 so that the motor may be employed for driving a shaft 19 journaled on an opposite lop-like lug 17 of the jaw 12, said shaft bearing an eccentric shaft 20. In order to receive the motor 18 and the shaft 10 the loop-like lugs 17 of the upper jaw 12 extend past the bearing part of the rod 15 (which functions as the pivot shaft) in the direction of insertion to the front so that there is practically a two-armed balance or scales pivoting at the axis of rocking. The eccentric shaft 20 lies on a stationary rest 21, whose height may be adjusted. For this purpose it is possible, as best shown in FIG. 1, simply to provide a screw which is able to be set against a lateral projection on the plate constituting the lower jaw 11 with spacer elements therebetween. In order to reduce frictional resistance, it is possible for a race ring running on balls to be mounted on the eccentric pin. Similarly the shaft 19 can be journaled by the intermediary of a ball bearing 30 in the associated lug 17. In addition, the eccentric shaft 20 can be journaled by a ball bearing 32. The motor 18 is attached in the associated lug 17. In order to hold the eccentric shaft 20 permanently in engagement with the stationary rest 21, a setting spring 22 is provided which on the one hand bears against a lug 17 of the upper jaw 12 and on the other hand against a part, fixed to the housing, in the present case on the plate 3.

The motor 18 is, as shown in FIG. 1, provided with a control device 23 by means of which the motor 18 is controlled so that the flap forming the upper jaw 12 can be lowered as soon as, chip card is properly inserted, and is raised once the communication with the chip card has been completed. For one complete rotation of the shaft 19 driven by the motor 18 and accordingly of the eccentric shaft 20 connected with it, the flap constituting the upper jaw 12 is raised and lowered once. Therefore for lifting and, respectively, lowering the flap the motor 18 does not have to be reversed and in fact can always rotate in a single direction.

In order to determine the upper and respectively, lower position of the flap constituting the upper jaw, the shaft 19 is provided with position markers 24 associated with such positions and offset by 180° from each other, which are able to be sensed by associated sensors 25. The sensors 25, the sensor 6 arranged at the rear end of the receiving space 2 and furthermore the reading head 1 are connected by signal conducting lines with the control device 23, which converts the input signal into control commands for switching the motor 18 on and off. As soon as the leading edge of a chip card inserted into the receiving space 2 actuates the sensor 6, the control to device 25 will receive via the associated signal conducting line an indication that the a chip card is present. Then the motor 18 is switched on until the sensor 25 corresponding to the lowered position upper jaw 12 responds. The control device 25 converts the corresponding information arriving via the signal line 27 into a stop command for the motor 18. As soon as the read head 1 via the signal line 28 provides a signal indicating the end of a communication operation to the control device 23, the motor 18 is turned on again and runs as long as the sensor 25 corresponding to the lifted position of the upper jaw 12 responds. The corresponding signal is converted by means of the control device 23 again into a stop command for the motor 18. The upper jaw 12 accordingly remains in the upper position. In this position of the upper jaw 12 it is possible for a chip card which has been scanned to be removed through the gap 9 and, respectively, a new chip card to be inserted through the gap 9. This situation is indicated in FIG. 1.

I claim:

1. A device for holding a chip card to be scanned by a scanning device, comprising:

a housing defining a slot;

a floor;

a plate which defines a receiving space with said floor for receiving a chip card;

a rear jaw extending from said floor;

an upper jaw supported by said housing to pivot relative to said rear jaw, said rear jaw and said upper jaw defining an intake gap which joins said receiving space, said upper jaw including a pair of spaced apart lugs;

means mounted on said lugs for pivoting said upper jaw relative to said rear jaw;

lateral edge ribs located at each lateral edge of said rear jaw; and rear edge ribs located at a front edge of said rear jaw, wherein said rear jaw and upper jaw extend outwardly from said lot, said means for pivoting includes a motor, a shaft connected to and driven by said motor, an eccentric pin extending outwardly from said shaft, a stationary rest on which said eccentric pin lies, and a setting spring which holds said eccentric pin permanently in engagement with said stationary rest, and wherein said setting spring is connected at one end to one of said mounting lugs and at its other end to said plate.

2. The device as defined in claim 1, wherein said stationary rest is adjustable in height.

3. The device as defined in claim 1, wherein said motor is mounted to said other of said mounting lugs.

4. The device as defined in claim 1, further comprising:

a pair of sensors, and wherein said shaft includes two position markers offset relative to each other by 180, and are dectable by said pair of sensors.

5. The device as defined in claim 1, further comprising:

a further sensor mounted on an outer edge of said floor opposite to said rear edge ribs; and a control device connected to said motor, to said pair of sensors and to said further sensor, and wherein said motor is controlled by said control device by means of which the output signals from said pair of sensors and said further sensor are processed to produce control commands for said motor.

6. The device as defined in claim 1, wherein said support lugs are formed as loop-like lugs.

* * * * *